(12) United States Patent
Morton et al.

(10) Patent No.: US 11,442,019 B2
(45) Date of Patent: Sep. 13, 2022

(54) FLUID ANALYSIS AND MONITORING USING OPTICAL SPECTROSCOPY

(71) Applicant: VIRTUAL FLUID MONITORING SERVICES LLC, Houma, LA (US)

(72) Inventors: Chris Morton, Duluth, MN (US); Scott Rudder, Hopewell, NJ (US)

(73) Assignee: VIRTUAL FLUID MONITORING SERVICES, LLC, Houma, LA (US)

( * ) Notice: Subject to any disclaimer, the term of this patent is extended or adjusted under 35 U.S.C. 154(b) by 561 days.

(21) Appl. No.: 16/444,597

(22) Filed: Jun. 18, 2019

(65) Prior Publication Data

US 2019/0383745 A1  Dec. 19, 2019

Related U.S. Application Data

(60) Provisional application No. 62/686,859, filed on Jun. 19, 2018.

(51) Int. Cl.
| | | |
|---|---|---|
| *G01J 3/44* | (2006.01) | |
| *G01N 21/65* | (2006.01) | |
| *G01N 1/42* | (2006.01) | |

(52) U.S. Cl.
CPC ............... *G01N 21/65* (2013.01); *G01N 1/42* (2013.01)

(58) Field of Classification Search
CPC .. G01N 21/65; G01N 1/42; G01N 2015/0053; G01N 15/06; G01N 21/85;
(Continued)

(56) References Cited

U.S. PATENT DOCUMENTS

| | | |
|---|---|---|
| 3,751,661 A | 8/1973 | Packer et al. |
| 3,859,851 A | 1/1975 | Urbanosky |

(Continued)

FOREIGN PATENT DOCUMENTS

| | | |
|---|---|---|
| GB | 2368391 A | 5/2002 |
| JP | 04050639 A | 2/1992 |

(Continued)

OTHER PUBLICATIONS

Feraud et al., "Independent Component Analysis and Statistical Modelling for the Identification of Metabolomics Biomarkers in 'H-NMR Spectroscopy", Journal of Biometrics & Biostatistics, vol. 8, Issue 4, pp. 1-8, 2017.

(Continued)

*Primary Examiner* — Abdullahi Nur
(74) *Attorney, Agent, or Firm* — FisherBroyles, LLP; Jason P. Mueller

(57) ABSTRACT

Systems, methods, and computer-program products for fluid analysis and monitoring are disclosed. Embodiments include a sampling system and an analytical system connected to the sampling system. A fluid may be routed through the sampling system and data may be collected from the fluid via the sampling system. The sampling system may process and transmit the data to the analytical system. The analytical system may include a command and control system to receive and store the data in a database and compare the data to existing data for the fluid in the database to identify conditions in the fluid. The system may further include a cooling system configured to enclose at least one member of the fluid analysis system. The cooling system encloses at least one member of the fluid analysis system including the excitation system, the detection system, the fluid inlet, the sample chamber, the Raman probe, and combinations thereof.

20 Claims, 9 Drawing Sheets

(58) Field of Classification Search
CPC ..... G01N 2015/003; G01N 2015/0687; G01N 2015/0693; G01N 2201/0231; G01J 3/44; A61B 5/0075
See application file for complete search history.

(56) References Cited

U.S. PATENT DOCUMENTS

| | | | |
|---|---|---|---|
| 4,396,259 A | 8/1983 | Miller | |
| 4,963,745 A | 10/1990 | Maggard | |
| 4,994,671 A | 2/1991 | Safinya et al. | |
| 5,139,334 A | 8/1992 | Clarke | |
| 5,161,409 A | 11/1992 | Hughes et al. | |
| 5,167,149 A | 12/1992 | Mullins et al. | |
| 5,194,910 A | 3/1993 | Kirkpatrick et al. | |
| 5,201,220 A | 4/1993 | Mullins et al. | |
| 5,266,800 A | 11/1993 | Mullins | |
| 5,331,156 A | 7/1994 | Hines et al. | |
| 5,349,188 A | 9/1994 | Maggard | |
| 5,360,738 A | 11/1994 | Jones et al. | |
| 5,497,008 A | 3/1996 | Kumakhov | |
| 5,557,103 A | 9/1996 | Hughes et al. | |
| 5,598,451 A | 1/1997 | Ohno et al. | |
| 5,604,441 A | 2/1997 | Freese et al. | |
| 5,684,580 A | 11/1997 | Cooper et al. | |
| 5,701,863 A | 12/1997 | Cemenska et al. | |
| 5,717,209 A | 2/1998 | Bigman et al. | |
| 5,739,916 A | 4/1998 | Englehaupt | |
| 5,751,415 A | 5/1998 | Smith et al. | |
| 5,754,055 A | 5/1998 | McAdoo et al. | |
| 5,859,430 A | 1/1999 | Mullins et al. | |
| 5,939,717 A | 8/1999 | Mullins | |
| 5,982,847 A | 11/1999 | Nelson | |
| 5,986,755 A | 11/1999 | Ornitz et al. | |
| 5,999,255 A | 12/1999 | Duppe et al. | |
| 6,028,667 A | 2/2000 | Smith et al. | |
| 6,100,975 A | 8/2000 | Smith et al. | |
| 6,274,865 B1 | 8/2001 | Schroer et al. | |
| 6,289,149 B1 | 9/2001 | Druy et al. | |
| 6,350,986 B1 | 2/2002 | Mullins et al. | |
| 6,452,179 B1 | 9/2002 | Coates et al. | |
| 6,474,152 B1 | 11/2002 | Mullins et al. | |
| 6,507,401 B1 | 1/2003 | Turner et al. | |
| 6,707,043 B2 | 3/2004 | Coates et al. | |
| 6,734,963 B2 | 5/2004 | Gamble et al. | |
| 6,753,966 B2 | 6/2004 | Von Rosenberg | |
| 6,775,162 B2 | 8/2004 | Mihai et al. | |
| 6,779,505 B2 | 8/2004 | Reischman et al. | |
| 6,897,071 B2 | 5/2005 | Sonbul | |
| 6,956,204 B2 | 10/2005 | Dong et al. | |
| 6,989,680 B2 | 1/2006 | Sosnowski et al. | |
| 7,043,402 B2 | 5/2006 | Phillips et al. | |
| 7,095,012 B2 | 8/2006 | Fujisawa et al. | |
| 7,391,035 B2 | 6/2008 | Kong et al. | |
| 7,581,434 B1 | 9/2009 | Discenzo et al. | |
| 7,589,529 B1 | 9/2009 | White et al. | |
| 7,842,264 B2 | 11/2010 | Cooper et al. | |
| 7,855,780 B1 | 12/2010 | Djeu | |
| 7,938,029 B2 | 5/2011 | Campbell et al. | |
| 8,018,596 B2 | 9/2011 | Salerno et al. | |
| 8,155,891 B2 | 4/2012 | Kong et al. | |
| 8,781,757 B2 | 7/2014 | Farquharson et al. | |
| 9,261,403 B2 | 2/2016 | Walton et al. | |
| 9,341,612 B2 | 5/2016 | Gorritxategi et al. | |
| 9,606,063 B2 | 3/2017 | Lee et al. | |
| 2002/0030868 A1 | 3/2002 | Salomaa | |
| 2004/0046121 A1 | 3/2004 | Golden et al. | |
| 2004/0241045 A1 | 12/2004 | Sohl, III et al. | |
| 2006/0053005 A1 | 3/2006 | Gulati | |
| 2006/0169033 A1 | 8/2006 | Discenzo | |
| 2006/0283931 A1 | 12/2006 | Polli et al. | |
| 2007/0078610 A1 | 4/2007 | Adams et al. | |
| 2007/0143037 A1 | 6/2007 | Lundstedt et al. | |
| 2009/0211379 A1 | 8/2009 | Reintjes et al. | |
| 2010/0255518 A1 | 10/2010 | Goix et al. | |
| 2011/0155925 A1 | 6/2011 | Ukon et al. | |
| 2011/0198500 A1 | 8/2011 | Hotier et al. | |
| 2011/0261354 A1 | 10/2011 | Sinfield et al. | |
| 2013/0050696 A1 | 2/2013 | Antunovich et al. | |
| 2014/0188404 A1 | 7/2014 | Von Herzen et al. | |
| 2014/0188407 A1 | 7/2014 | Von Herzen et al. | |
| 2014/0212986 A1 | 7/2014 | Angelescu et al. | |
| 2014/0229010 A1 | 8/2014 | Farquharson et al. | |
| 2015/0211971 A1 | 7/2015 | Little, III et al. | |
| 2015/0300945 A1 | 10/2015 | Gao et al. | |
| 2016/0069743 A1 | 3/2016 | McQuilkin et al. | |
| 2016/0132617 A1* | 5/2016 | Liu | G01J 3/42 703/2 |
| 2016/0187277 A1 | 6/2016 | Potyrailo et al. | |
| 2016/0195509 A1 | 7/2016 | Jamieson et al. | |
| 2016/0313237 A1 | 10/2016 | Young et al. | |
| 2016/0363728 A1 | 12/2016 | Wang et al. | |
| 2017/0016843 A1 | 1/2017 | Gryska et al. | |
| 2017/0234819 A1 | 8/2017 | Lilik et al. | |
| 2018/0246031 A1* | 8/2018 | Proskurowski | G01N 21/01 |
| 2018/0292266 A1* | 10/2018 | Slater | G01J 3/44 |

FOREIGN PATENT DOCUMENTS

| | | |
|---|---|---|
| JP | 04077648 A | 3/1992 |
| JP | 09138196 A | 5/1997 |
| JP | 2000509155 A | 7/2000 |
| JP | 2003534528 A | 11/2003 |
| JP | 2004020412 A | 1/2004 |
| JP | 2011133370 A | 7/2011 |
| JP | 2012112759 A | 6/2012 |
| JP | 2012136987 A | 7/2012 |
| JP | 2014130141 A | 7/2014 |
| RU | 2516200 C2 | 5/2014 |
| WO | 0136966 A2 | 5/2001 |

OTHER PUBLICATIONS

Knauer et al., "Soot Structure and Reactivity Analysis by Raman Microspectroscopy, Temperature-Programmed Oxidation, and High-Resolution Transmission Electron Microscopy", J. Phys. Chem. V. 113, pp. 13871-13880, 2009.

"Raman Applications Throughout the Petroleum Refinery Blending to Crude Unit", Apr. 26, 2018, APACT Conference, Newcastle, United Kingdom.

Gebarin S. | On-line and In-line Wear Debris Detectors: What's Out There? On-line article, https://machinerylubrication.com/Articles/Print/521, Apr. 3, 2019.

"Breakthrough study opens door to broader biomedical applications for Raman spectroscopy", by IOS Press, Feb. 19, 2013, https://phys.org/news/2013-02-breakthrough-door-broader-biomedical-applications.html.

Cheng B. et al | "Thermal Oxidation Characteristic of Ester Oils Based on Raman Spectroscopy", STLE Atlanta, May 21-25, 2017.

Cooper D.| "SFG Spectroscopy is Key to Oil Industry Research", Phonics Spectra, Mar. 2014.

"Accurate and Dependable Choice for In-Service Oil and Fuel Analysis", https://www.azom.com/article.aspx?ArticleID=14948 May 17, 2018.

Ge , et al | "Raman Spectroscopy of Diesel and Gasoline Engine-Out Soot Using Different Laser Power" www.researchgate.net/publication/328528476, Sep. 22, 2019.

* cited by examiner

FLUID ANALYSIS AND MONITORING USING OPTICAL SPECTROSCOPY

CROSS-REFERENCE TO RELATED APPLICATIONS

This application claims the benefit of U.S. Provisional Patent Application No. 62/686,859, filed Jun. 19, 2018, and is related to U.S. patent application Ser. No. 15/997,612 (allowed), filed Jun. 4, 2018, which is a continuation-in-part of U.S. patent application Ser. No. 15/139,771 (now U.S. Pat. No. 10,151,687), filed Apr. 27, 2016, which claims the benefit of U.S. Provisional Patent Application No. 62/237,694, filed Oct. 6, 2015, U.S. Provisional Patent Application No. 62/205,315, filed Aug. 14, 2015, and U.S. Provisional Patent Application No. 62/153,263, filed Apr. 27, 2015. This application is related to U.S. Provisional Patent Application No. 62/598,912, filed Dec. 14, 2017, U.S. Provisional Patent Application No. 62/596,708, filed Dec. 8, 2017, U.S. Provisional Patent Application No. 62/569,384, filed Oct. 6, 2017, and U.S. Provisional Patent Application No. 62/514,572, filed Jun. 2, 2017. This application is also related to International Patent Application No. PCT/US18/35915 filed on Jun. 4, 2018, and U.S. patent application Ser. No. 16/000,616, filed on Jun. 5, 2018, U.S. patent application Ser. No. 16/173,182, filed on Oct. 29, 2018, and U.S. patent application Ser. No. 16/173,200, filed on Oct. 29, 2018. The contents of the above-referenced patent applications are incorporated herein by reference in their entireties.

BRIEF DESCRIPTION OF THE DRAWINGS

The accompanying drawings form a part of the disclosure and are incorporated into the subject specification. The drawings illustrate example embodiments and, in conjunction with the specification and claims, serve to explain various principles, features, or aspects of the disclosure. Certain embodiments are described more fully below with reference to the accompanying drawings. However, various aspects be implemented in many different forms and should not be construed as limited to the implementations set forth herein. Like numbers refer to like, but not necessarily the same or identical, elements throughout.

DETAILED DESCRIPTION

Figure 1:
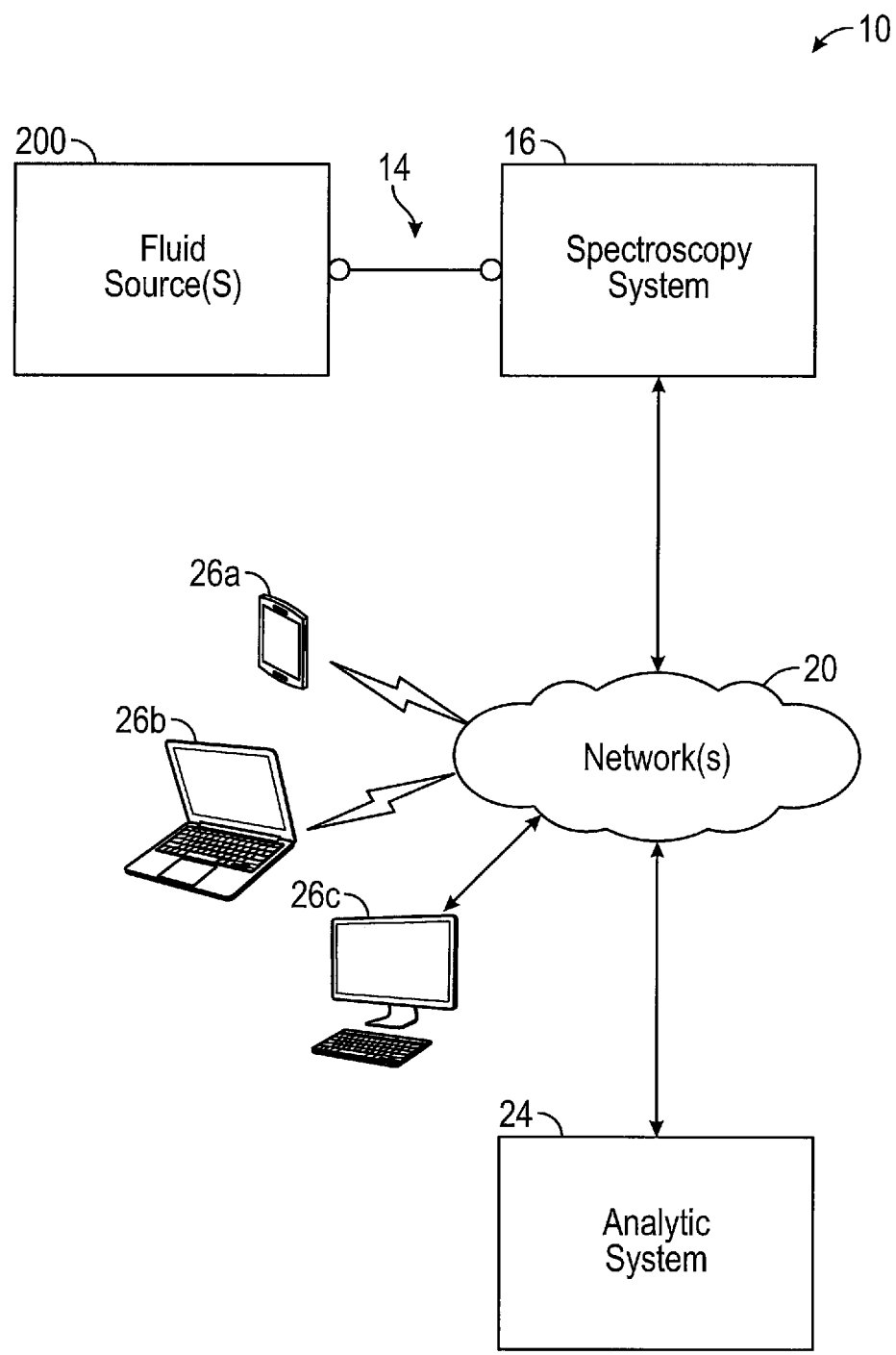
FIG. 1 is a schematic of a fluid analysis and monitoring system, according to an example embodiment of the disclosure.

One of the keys to keeping machinery operating at optimal performance is monitoring and analyzing working fluids, including lubricant oils, for characteristics such as contamination, chemical content, and viscosity. The existence or amount of debris and particles from wearing parts, erosion, and contamination provide insights about issues affecting performance and reliability. Indeed, accurately and effectively analyzing and trending data about a fluid may be critical to the performance and reliability of a particular piece of equipment. The benefits of improved predictive monitoring and analysis of fluids include: optimized machinery performance, optimized maintenance planning and implementation, lower operational and maintenance costs, fewer outages, improved safety, and improved environmental impacts.

This disclosure provides improved systems and methods for fluid monitoring and analysis. Disclosed systems and methods accurately and effectively gather, trend and analyze key data for improved proactive predictive maintenance. Embodiments of the disclosure include automated systems that directly monitor multiple conditions of a fluid, for example, engine oil actively flowing through working engines. In embodiments, a single system is provided that actively monitors the condition of fluids flowing through multiple pieces of machinery, for example, oils flowing through multiple engines, on a set schedule or on-demand as directed by an operator using a web-based portal or a mobile application. Fluids may be analyzed while machinery is on-line such that normal operation is not disrupted. Fluids can be effectively monitored and analyzed in real-time, that is, a report can be sent to an operator in minutes. This is a significant improvement over conventional oil analysis systems, which may involve collecting a sample from a specific piece of machinery and sending it off-site for analysis—often taking 3 to 7 days to get results back, which are additionally prone to human error.

Embodiments of the disclosure include collecting optical spectroscopy data from fluid samples such as oil and sending that data to an analytic system that then determines fluid/oil characteristics and/or identifies potential issues with a particular piece of machinery. Monitored conditions may include determining a presence of a wear metal in the oil, the presence of an amount of an additive in the oil, the presence of water in the oil, the total acid number (TAN) of the oil, the total base number (TBN) of the oil, the presence of coolant in the oil, the presence of fuel in the oil, and/or the particle count of particulate matter (e.g., soot and other particles) within the oil. For example, specific engine problems, such as a bearing that is wearing or a gasket that is leaking, may be identified based on specific materials (e.g., particular wear metals) identified in an engine oil. Additional variables (e.g., temperature, pressure, and viscosity of the fluid/oil) may be monitored and data associated with these variables may be analyzed in conjunction with spectroscopic information to further characterize conditions of the fluid/oil.

Embodiments of the disclosure include hardware that directly couples to a piece of machinery (e.g., an engine), and collects spectral data, and other data characterizing a fluid, in-situ, while the machinery is in operation. The collected data is then analyzed using machine learning computational techniques and compared with an evolving collection of reference data stored in one or more databases. For example, machine learning models that characterize various known materials in a fluid may be built and stored in a database. Such models may be constructed by using machine learning techniques to identify composition dependencies of spectral features for well-characterized training data.

Training data may include spectroscopic data for a plurality of samples of a fluid/oil having known concentrations of an impurity of contaminant of interest as characterized by an analytical laboratory using conventional analytical techniques. Spectral training data may be obtained for contamination targets, such as fuel or coolant contamination, by producing physical samples having known concentrations (e.g., serial dilution) of fuel or coolant. Degradation samples, which are positive for a specific degradation target (e.g., soot, wear metal, etc.) may be obtained from an analytical laboratory that evaluates used oil samples though conventional means. Samples obtained from an analytical laboratory may be completely characterized using a battery of conventional analytical techniques. Resulting machine learning models may include classifier models, decision tree models, regression models, etc.

Then, spectroscopic data that is gathered, in-situ, in real-time (i.e., while equipment is operating) may be analyzed using similar machine learning techniques to determine correlations with the stored models to determine a presence of one or more known components within the otherwise unknown mixture of materials found in the fluid or lubricating oil of the operating machine. For example, a classifier model may be used to predict whether data from a newly analyzed sample has a concentration above or below a predetermined threshold for one or more contaminants of interest (e.g., soot, coolant, fuel, etc., in the oil).

Such analytical methods may allow preventive measures to be taken (e.g., by an operator or automatically by a control system) to avoid critical failures and to promote proper functioning, performance, and longevity of operating machinery through the use of informed proactive operation and maintenance practices based on the analysis of the fluid condition.

As described in greater detail below, a fluid analysis system may be provided that performs Raman spectroscopic measurements to detect molecular vibrational characteristics of opaque fluids such as motor oil. The system may use a Raman probe and a Raman sub-sampling system. The system may also include multiple excitation sources, a detection system, and an optical switch, as well as power, and control circuitry housed in a single enclosure that is provided with active cooling systems. The system may collect, process, and analyze data from multiple fluid sources. One or more analytical systems may be provided that analyze such data using machine learning computational techniques to determine fluid conditions, in-situ, in real-time (i.e., while a piece of machinery is in operation).

Embodiments of the disclosure, which are discussed in detail herein, include a Raman spectral excitation and detection system that is directly coupled to operating machinery that gathers Raman spectral data from working fluids, in-situ, while the machine is operating (i.e., in real time). Disclosed systems further include an analytical system that performs fluid analysis using machine learning techniques to determine the composition of the working fluids.

Raman spectroscopy allows determination of spectral characteristics in the ultraviolet, near-infrared, and infrared spectrum. Accordingly, a broad array of target materials may be optically identified using a single technique. In this regard, Raman spectroscopy provides advantages over other spectroscopic techniques, including techniques that are based on the use of infrared and near infrared radiation. Traditionally, application of Raman spectroscopy has not been used to analyze complex fluids such as opaque fluids (e.g., motor oil) because Raman spectroscopy can produce auto-fluorescence signals that often dominate and essentially mask the Raman signal, particularly in opaque fluid samples.

Disclosed embodiments, including systems, methods, and computer program products, provide improved fluid analysis capabilities that include Raman spectroscopy techniques that are reliably and efficiently used for analysis of opaque fluids such as motor oil. Analytic models disclosed herein may then be used to analyze resulting Raman spectral data, as well as other fluid data (e.g., temperature, viscosity, etc.) and other optical sensor information to identify a variety of contaminants, wear metals, oil dilution fluids, etc., to allow prediction and diagnosis of fluid conditions. Analytical models may also take into account fluorescence and absorbance spectral data along with Raman spectral data to provide a complete characterization of fluids of interest.

FIG. 1 is a schematic of a fluid analysis and monitoring system 10, according to an example embodiment of the disclosure. System 10 includes one or more fluid sources 200 and a spectroscopy system 16 that are operationally coupled (e.g., optically coupled, mechanically coupled, electrically coupled, electromechanically coupled, and/or electro-optically coupled). In this regard, a coupling assembly 14 may provide a mechanical and fluidic coupling between fluid source 200 and spectroscopy system 16. Coupling system 14 may additionally provide electrical and optical coupling between fluid source 200 and spectroscopy system 16. As such, coupling system 14 may include various coupling mechanisms and/or coupling devices, including tubing, fittings, optical fiber cables, etc. Further details of embodiments related to fluid analysis and monitoring system 10, spectroscopy system 16, analytical system 24, and various methods of operation and data analysis are provided in U.S. patent application Ser. No. 15/997,612, filed Jun. 4, 2018, the disclosure of which is incorporated herein by reference in its entirety.

As described in greater detail below, spectroscopy system 16 may perform spectroscopy measurements on fluids provided by fluid source 200. Spectroscopic data determined by spectroscopy system 16 may then be transferred to other devices via a wired or wireless network 20 through wired or wireless links 22a and 22b. Various user devices 26a, 26b, 26c, etc., may communicate with spectroscopy system 16 via network 20 to perform data analysis operations and to provide command and control instructions to spectroscopy system 16. Spectroscopy system 16 may further communicate with one or more analytic systems 24 via network 20 through wired or wireless links 22a and 22b. Spectroscopy system 16 may further communicate directly with analytic system 24 through one or more direct wired or wireless links 22c.

Analytic system 24 may perform a statistical analysis on data received from spectroscopy system 16 to determine conditions of the fluid/oil. For example, analytic system 24 may determine a chemical composition of the fluid. Analytic system 24 may further determine a concentration of various contaminants in the fluid. Analytic system 24 may be implemented in a variety of ways. In a non-limiting example, analytic system 24 may be implemented as a circuit element in hardware, or may be implemented in firmware or software of a computing system. Analytic system 24 may be implemented on a local computing device or may be implemented in a cloud based computing platform using cloud based tools. In a further embodiment, analytic system 24 may be implemented in a data center or other server based environment using a service provider's tools or using custom designed tools.

According to an embodiment, fluid source 200 may be a mechanical device such as an engine, generator, turbine, transformer, etc., that employs a fluid (e.g., an oil) as a lubricant, as a hydraulic working fluid, etc. An example of an engine may be an internal combustion engine. Fluid source 200 may be a single engine or may include groups of different types of engines. Example engines may include one or more of: a two-stroke engine, a four-stroke engine, a reciprocating engine, a rotary engine, a compression ignition engine, a spark ignition engine, a single-cylinder engine, an in-line engine, a V-type engine, an opposed-cylinder engine, a W-type engine, an opposite-piston engine, a radial engine, a naturally aspirated engine, a supercharged engine, a turbocharged engine, a multi-cylinder engine, a diesel engine, a gas engine, or an electric engine. In other embodiments, system 10 for a fluid analysis and monitoring system may include various other fluid sources 200. In other embodiments, fluid source 200 may be associated with an oil drilling operation, an oil refinery operation, a chemical processing plant, or other industrial application for which fluid monitoring may be desired.

Figure 2:
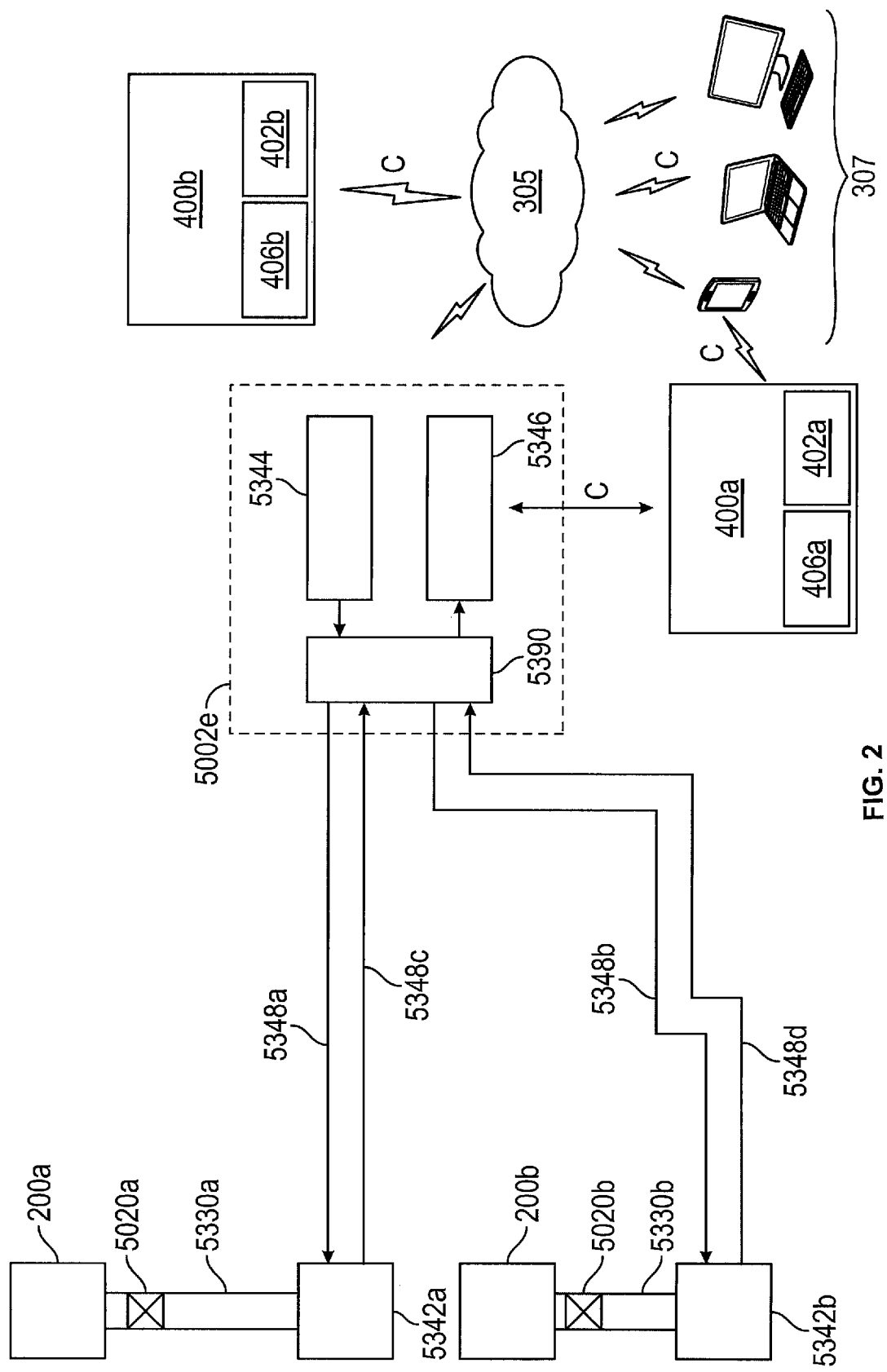
FIG. 2 is a schematic of a fluid analysis and monitoring system, according to an example embodiment of the disclosure.

FIG. 2 is a schematic of a fluid analysis and monitoring system 5000e, connected to fluid sources 200a and 200b, according to an example embodiment of the disclosure. Other embodiments may include only a single fluid source or a plurality of fluid sources, as described in greater detail below with reference to FIG. 4A. Multi-engine monitoring systems may allow fluid monitoring on any multi-engine equipment. Specific examples of multi-engine systems that may benefit from the disclosed systems, apparatus and methods may include multi-engine ships, vessels, barges, tankers, airplanes, industrial equipment, wind farms, solar arrays, and the like.

Fluid source 200a may be fluidly coupled to sample chamber 5330a and fluid source 200b may be fluidly coupled to sample chamber 5330b. Sample chamber 5330a may include a valve 5020a. Similarly, sample chamber 5330b may include a valve 5020b. System 5000e may include an excitation source 5344 and a detection system 5346 configured to generate and detect electromagnetic energy. System 5000e may further include an optical switch 5390. According to an embodiment, excitation source 5344, detection system 5346, and optical switch 5390 may be housed in an enclosure 5002e.

Optical switch 5390 may be optically connected to excitation source 5344 via fiber optic cable 5348e. Optical switch 5390 may be configured to receive electromagnetic radiation from excitation source 5344 via fiber optic cable 5348e and may be configured to provide such radiation to optical probe 5342a via fiber optic cable 5348a. Similarly, optical switch 5390 may be configured to provide electromagnetic radiation to optical probe 5342b via fiber optic cable 5348b. Optical switch 5390 may be configured to selectively provide radiation to optical probe 5342a only, to optical probe 5342b only, or to both probes 5342a and 5342b.

Optical components may be connected to one another via optical cables having an appropriate diameter. In one embodiment an optical fiber connection may connect an electromagnetic radiation source (e.g., a laser) and an optical switch to an optical excitation fiber having a diameter of about 100 µm. In one embodiment an optical fiber connection may connect an optical switch to an optical emission fiber having a diameter of about 200 µm. In one embodiment an optical switch may be configured with one or more optical fibers having diameters of about 50 µm. In one embodiment an optical combiner may be configured with one or more optical fibers having diameters of about 200 µm. In further embodiments, various other diameter fibers may be used. For example, similar data throughput may be obtained with larger diameter fibers and decreased acquisition time. Similarly, smaller diameter fibers may be used with increased acquisition time to achieve a comparable data throughput.

Optical switch 5390 may further be configured to receive reflected, scattered, and emitted radiation from optical probe 5342a via fiber optic cable 5348c and to receive reflected, scattered, and emitted radiation from optical probe 5342b via fiber optic cable 5348d. Optical switch may then provide the received electromagnetic radiation to detection system 5346 via fiber optic cable 5348f.

Optical switch 5390 may be configured to selectively receive radiation from optical probe 5342a only, from optical probe 5342b only, or from both probes 5342a and 5342b. In further embodiments, fluid analysis and monitoring systems, similar to system 5000e of FIG. 2 may be configured to receive fluid from one fluid source, from three fluid sources, from four fluid sources, etc. In other embodiments additional fluid sources may be monitored. While there is no specific limit to the number of fluid sources that may be monitored, in one specific embodiment, a rotary optical switch may be employed to detect up to thirty-two (32) separate fluid sources. According to an embodiment, optical switch may be configured to make electrical as well as optical communication with excitation source 5344 and a detection system 5346 and with a control system, as described below.

System 5000e further includes analytical systems 400a and 400b. Analytical systems 400a and 400b may communicate with user devices 307 through one or more networks 305, according to an example embodiment of the disclosure. Analytical systems 400a and 400b further include command and control systems 406a and 406b and databases 402a and 402b, as described in greater detail below.

Analytical system 400a may be directly connected to fluid monitoring system 5000e as an external storage device. In further embodiments, analytical system 400a may be located onboard a ship or on other remote structure. System 5000e may provide data to analytical system 400a through a direct wired or wireless connection (e.g., shown by double arrow C), that provides a bi-directional communication link.

In a further embodiment, an analytical system 400b may be provided as a remote device that is accessible through one or more networks 305. Network 305 may be a local area network (LAN), a wide area network (WAN), or may be the Internet. In further embodiments, analytical system 400b may be implemented as a software module running on a remote device, on a server, or on a cloud based computing platform. Bi-directional wireless links C may also be provided to connect analytical system 400b with network 305, to connect network 305 with user devices 307, to connect user devices 307 with analytical system 400a, and to connect fluid monitoring system 5000e with network 305.

In further embodiments, fluid monitoring system 5000e may provide data to analytical system 400b, for example, via network 305 through an uplink to a LAN/WAN connection, which may be encrypted or unencrypted, via cellular, satellite, Wi-Fi, Bluetooth, Ethernet (RJ-45) connections, etc.

A user interface may be provided on one or more user devices 307. User devices 307 may communicate directly with analytical system 400a via a wired or wireless connection. User devices 307 may also communicate indirectly with analytical system 400b via network 305. A user may access and/or modify analytical systems 400a and/or 400b via a web application, for example, running on a computing device 307 (e.g., a desktop computer, portable device, etc.) through any type of encrypted or unencrypted connection, as described above.

Analytical systems 400a and 400b may include respective command and control systems 406a and 406b, as shown in FIG. 2. Command and control systems 406a and 406b may be configured to receive data from fluid monitoring system 5000e and to store such data in respective databases 402a and 402b of analytical systems 400a and 400b. Command and control systems 406a and 406b may compare received data to previously-determined data for particular fluids stored in respective databases 402a and 402b. Based on the comparison, command and control systems 406a and 406b may identify correlations between received data and previously stored data for particular fluids. The identified correlations may then be used to identify conditions of the fluid. The identified conditions of the fluid may include chemical composition, presence of impurities, debris, wear metals, etc.

Command and control systems 406a and 406b may be configured as hosted software systems that may receive data collected by fluid monitoring system 5000e for a submitted sample of the fluid. Command and control systems 406a and 406b may then process such data through a set of existing machine learning models to generate a predictive analysis of properties and conditions of the fluid. Machine learning models may be configured to target any type of fluid to be analyzed. The resulting output of the sample analysis will generally be dependent on the fluid submitted, the networks processed (i.e., in the case of neural network models), and the statistical percentage accuracy of the given machine learning model. In various embodiments, a user may update existing machine learning models or build new machine learning models (via "training") if received data does not correspond to any of a set of existing machine learning models. In various embodiments, command and control systems 406a and/or 406b may then deploy updated and/or new machine learning models back to the fluid monitoring system 5000e. In various embodiments, command and control systems 406a and 406b may also be configured to manage a user/client's security credentials and customized settings.

Database 402a may be located on a computer readable storage device such as a non-transitory memory device. For example, database 402a may be located on a read-only-memory (ROM) device. Database 402a may also be stored on a volatile storage device such as a random-access-memory (RAM) device. Database 402b may be located on an external device that is accessible via network 305. For example, database 402b may be located on a server or on a cloud based computing platform.

Databases 402a and 402b may be used to collect and store data relating to different types of fluids (e.g., types of oil and water) and their conditions. Fluids may include, but are not limited to, any type of industrial fluids or liquids, such as coolants, waste water, etc. Oils may include any type of oil, including but not limited to, very light oils such as jet fuels and gasoline, light oils such as diesel, No. 2 fuel oil, and light crudes, medium oils such as most crude oils, and heavy oils such as heavy crude oils, No. 6 fuel oil, and Bunker C.

The different "conditions" of fluid/oil samples may describe compositions containing various fluids, impurities, wear metals, additives, water, etc. Fluid "conditions" may also describe various properties such as viscosity, total acid number (TAN), total base number (TBN), and particle counts. In exemplary embodiments, existing data in databases 402a and 402b may include spectroscopic information regarding the molecular content or makeup of different types of fluid.

In some embodiments, default fluid sensor dashboards may also be provided for each installation site at time of installation of system 5000e. Such dashboards may be provided on a graphical user interface (GUI) (not shown) of a user device 307. Each approved user may have an ability to customize or alter these dashboards as desired. In exemplary embodiments, software associated with the dashboards may provide real-time monitoring and graphical updates at predetermined data rates. For example, graphical updates may be provided each time data is determined to have changed. In other embodiments data may be updated an update rate not to exceed 1 second, 10 seconds, 100 seconds, 180 seconds, etc.

In other embodiments, real-time display inclusive of graphical depictions may be capable of being continuously updated while data is being viewed. Data screens and access capabilities may be automatically resized to fit a viewing area of user devices 307 used to access the dashboards. Data acquisition and analytics in the dashboards may include, but is not limited to, the following capabilities: analytical comparatives and real-time updates (between fluid monitoring system 5000e and analytical systems 400a and 400b); predictive oil changing comparative analysis, chronograph data, financial comparative data; data regarding wear metals, particulate counts, viscosity, TAN, TBN, Nitration, Sulfation, Foreign Oils, Solvents, Glycol, Soot, Dissolved Gases, and/or Oil Additive Depletion (Zn, Mo, Pd, Ca, Mg, Ba, Na), area plots (illustrating how a customer may view a layout of the system 100a); and notifications suggesting that required maintenance is pending.

The above-described fluid monitoring system 5000e shows two fluid sources 200a and 200b with respective sampling chambers 5330a and 5330b having a "deadhead" configuration, that is, having only a single inlet and no outlet. Such a deadhead configuration may act as an optical port (that may include an optical probe) that may be connected directly into an engine galley. In further embodiments, a sampling chamber may be provided having a flow-through configuration, or the sample chamber may be omitted, as described in greater detail below.

Figure 3:
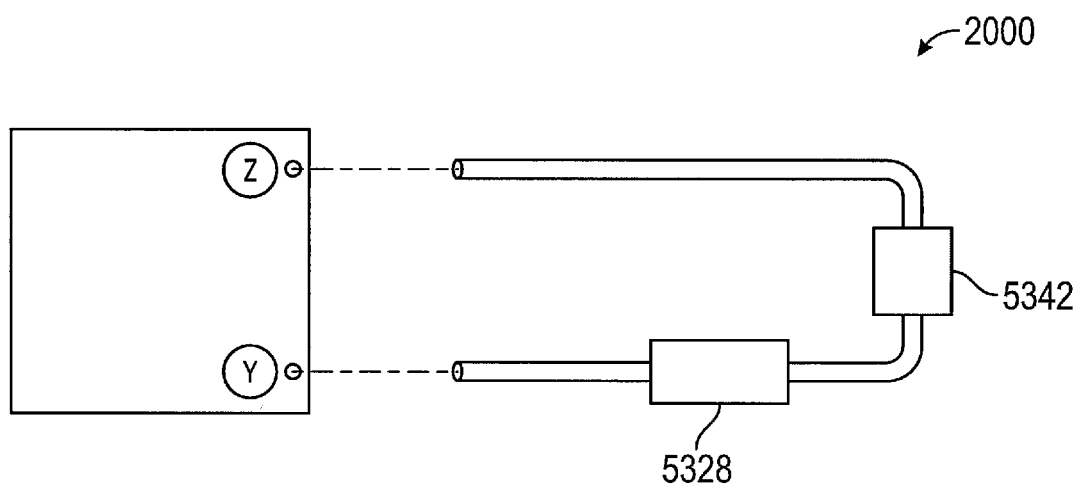
FIG. 3 shows a fluid analysis system, according to an example embodiment of the disclosure.

FIG. 3 shows a fluid analysis system 2000, according to an example embodiment of the disclosure. In this example, system 2000 may be provided with only a single sensor 5328 (e.g., a viscometer and/or temperature sensor) and an optical probe 5342. The optical probe 5342 may be provided directly in a fluid path. For example, optical probe 5342 may be an immersion probe that makes direct contact with fluid flowing through a fluid loop. In this example, a bypass loop may allow fluid/oil to flow (i.e., fluid may be routed) from equipment fluid access point, Y, to fluid return point, Z. As mentioned above, optical probe 5342 may be an immersion probe that makes direct contact with the fluid. In other embodiments, optical probe 5342 may be associated with a fluid flow-through sample chamber. In further embodiments, a fluid monitoring system may be provided that monitors fluid in a plurality of fluid sources, as described below with reference to FIG. 4A.

Figure 4A:
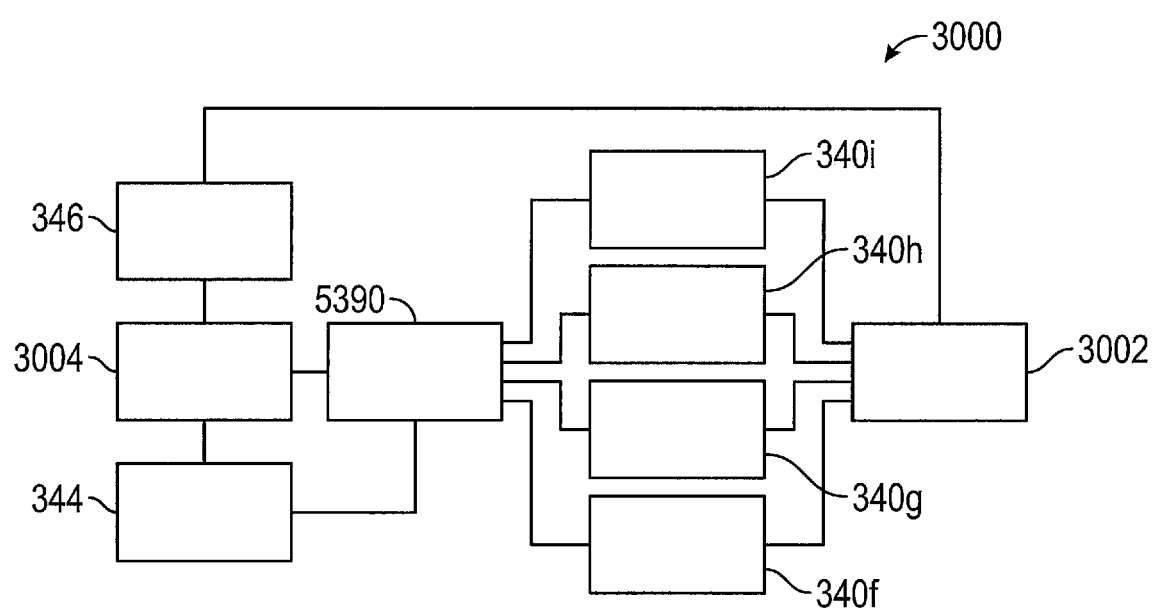
FIG. 4A is a schematic of a multi-source fluid sampling system, according to an example embodiment of the disclosure.

FIG. 4A is a schematic of a multi-source fluid sampling system 3000, according to an example embodiment of the disclosure. System 3000 includes a single excitation source 344, a single detection system 346, and a plurality of sample chambers (or fluid flow paths without sample chambers) 340*f*, 340*g*, 340*h*, and 340*i*. In this example, each of the sample chambers 340*f*, 340*g*, 340*h*, and 340*i* may be directly connected to respective fluid sources (not shown). For example, fluid sources may be internal combustion engines, generators, or other mechanical devices containing fluids of interest. In this example, four sources may be accommodated. Other numbers of fluid sources may be accommodated in other example embodiments. For example, an embodiment may have 5 fluid sources, 6 fluid sources, 7 fluid sources 8, fluid sources, etc. Sample chambers 340*f*, 340*g*, 340*h*, and 340*i* may have various configurations. For example, sample chambers 340*f*, 340*g*, 340*h*, and 340*i* may have deadhead configurations as shown in FIG. 2. In alternative embodiments, sample chambers 340*f*, 340*g*, 340*h*, and 340*i* may have flow-through configurations as shown in FIG. 3, for example. In further embodiments, optical immersion probes may interact directly with fluid in fluid flow paths 340*f*, 340*g*, 340*h*, and 340*i* without sample chambers.

System 3000 may further include an optical switch 5390 that may be configured to route electromagnetic energy, received from excitation source 344, to the various sample chambers (or fluid flow paths without sample chambers) 344*f*, 344*g*, 344*h*, and 344*i*. Electromagnetic radiation received from optical switch 5390 may thereby interact with fluid in respective sample chambers (or fluid flow paths) 344*f*, 344*g*, 344*h*, and 344*i*. System 3000 may further include passive optical coupler 3002. Optical coupler 3002 may be configured to receive electromagnetic radiation emitted by fluid in sample chambers (or fluid flow paths) 344*f*, 344*g*, 344*h*, and 344*i*, in response to interaction of the electromagnetic radiation received from optical switch 5390. The radiation received by optical coupler 3002 may be combined and provided to optical detection system 346 via optical fiber cables (shown but not specifically labeled). System 3000 may further include control hardware 3004 which may include control circuitry and/or one or more computational devices.

According to an embodiment, excitation source 344 may be a single laser (generating electromagnetic radiation suitable for Raman spectroscopy) and detection system 346 may include a single spectrometer. In further embodiments, the excitation system 344 may include two or more lasers that generate electromagnetic radiation at two or more respective frequencies. In certain embodiments, optical switch 5390 may be configured to direct the laser (suitable for Raman spectroscopy) excitation signal to one sample test chamber at a time. In another embodiment, the laser (suitable for Raman spectroscopy) signal may be split or routed to multiple sample test chambers simultaneously.

Raman spectroscopy is a spectroscopic technique that determines information about molecular vibrations of a sample. Determined information regarding molecular vibrations may then be used for sample identification and quantitation. The technique involves providing incident electromagnetic radiation (e.g., using a laser) to a sample and detecting scattered radiation from the sample. The majority of the scattered radiation may have a frequency equal to that of the excitation source (e.g., excitation source 344 of FIG. 4A). Such scattered radiation is known as Rayleigh or elastic scattering.

A small amount of the scattered light may be shifted in frequency from the incident laser frequency due to interactions between the incident electro-magnetic waves (i.e., photons) and vibrational excitations (i.e., induced transitions between vibrational energy levels) of molecules in the sample. Plotting intensity of this frequency-shifted radiation vs. frequency, or equivalently vs. wavelength, results in a Raman spectrum of the sample containing Raman shifted peaks.

Optical switch 5390 may be controlled by a combination of controller hardware 3004 and/or software that may select a specific sample chamber to which the laser (suitable for Raman spectroscopy) excitation signal may be routed. Following sample excitation by a laser (suitable for Raman spectroscopy) 344 excitation signal, sample Raman emission data may be collected by a single Raman emission detector 346 by using optical coupler 3002. Optical coupler 3002 may merge collection optical fibers of respective sample chambers into a single optical connection. The single optical connection may be further connected to a Raman spectrometer 346 configured to collect Raman emission data.

In certain embodiments, when the Raman excitation signal is routed to one sample chamber (or fluid path in the case of an immersion probe) at a time via optical switch 5390, optical coupler 3002 may passively sum the Raman emission signal from each sample test chamber. Raman emission signals derived from each sample test chamber may be continuously communicated to Raman spectrometer 346. Use of passive optical coupler 3002 may be advantageous in that it generally exhibits less attenuation of the Raman emission signal compared to use of a second optical switch for routing Raman emission signals to a single detection system. For example, a passive coupler (e.g., such optical coupler 3002) may exhibit only marginal signal attenuation, while an active optical switch (e.g., such as optical switch 5390) may attenuate the signal by an amount on the order of 15% of the signal, even for high-performance switches.

Figure 4B:
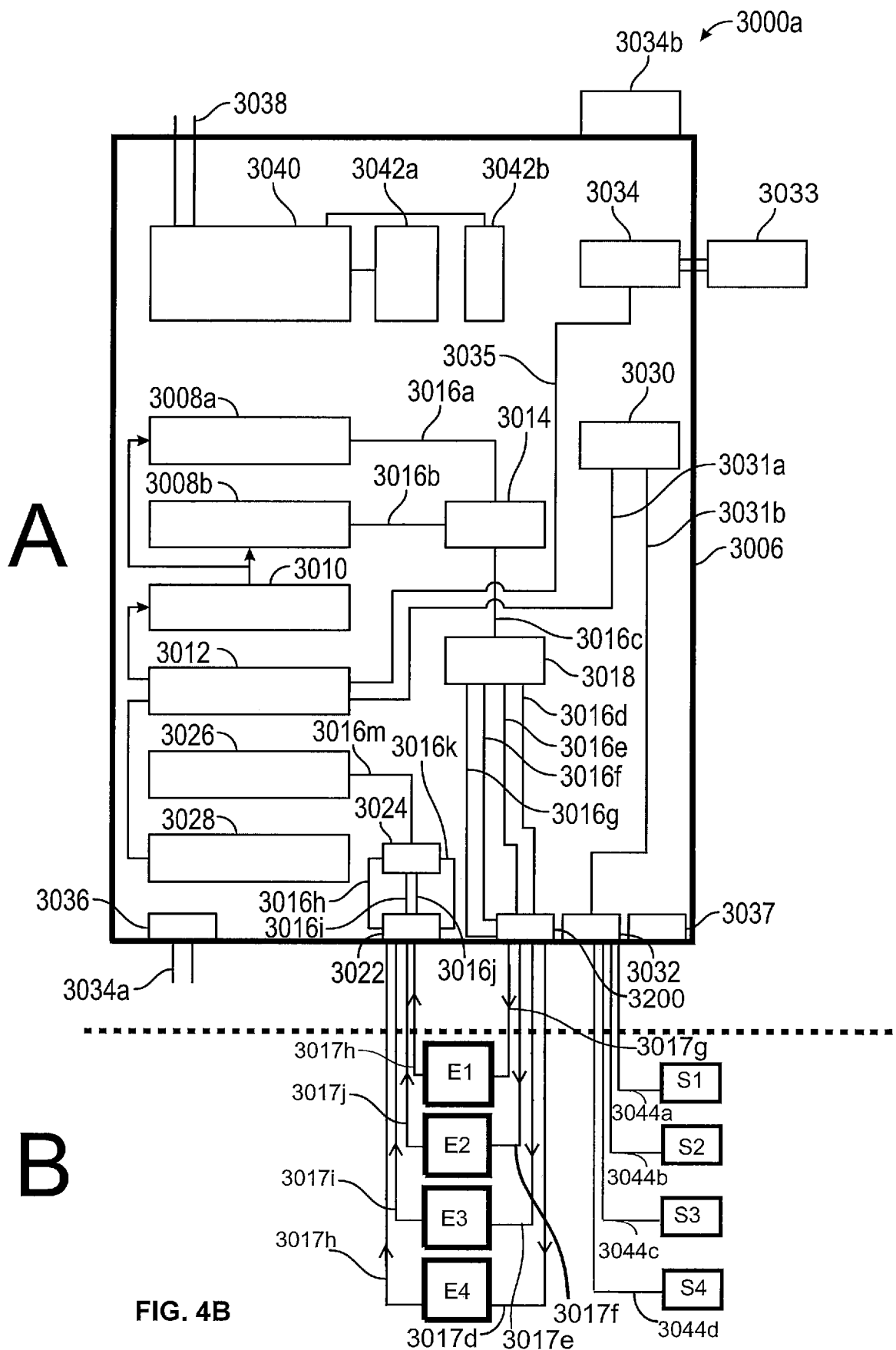
FIG. 4B is a schematic of a fluid sampling system, according to an example embodiment of the disclosure.

FIG. 4B is a schematic of a fluid sampling system 3000*a*, according to an example embodiment of the disclosure. System 3000*a* includes multiple excitation sources, an optical switch, power, and control circuitry, according to an example embodiment of the disclosure. System 3000*a* may provide an advantage in that all of the electronic and optical components may be housed in a single enclosure 3006. As described in greater detail below with reference to FIGS. 4B and 4C, system may be passively or actively cooled. Such cooling may provide improved performance of excitation sources (e.g., lasers, LEDs, etc.) and detection systems (e.g., CCD devices). As described below, system 3000*a* may be actively cooled to a temperature of 100° C. below ambient temperature. In other embodiments, other temperatures may be achieved including 5° C. below ambient, 10° C. below ambient, 20° C. below ambient, etc. Such cooling may allow greatly improved signal detection.

System 3000*a*, indicated in the top part of FIG. 4B (part A, shown above the dashed line) contains all of the electrical and optical systems that may be housed in a rugged, water tight enclosure 3006. As described in greater detail below, system 3000*a* provides fiber optic connections to external systems (part B, shown below the dashed line). In this way, fluids associated with external systems (B, below the dashed line) are kept separate from the electrical and optical components of system 3000*a* (A, above the line).

In this example, system 3000*a* may include first 3008*a* and second 3008*b* excitation sources. For example, excitation source 3008*a* may be a laser that emits electromagnetic radiation at a wavelength of 785 nm. Further excitation source 3008*b* may be a laser that emits electromagnetic radiation at a wavelength of 680 nm. On other embodiments, various other excitation sources may be provided that generate various wavelengths of electromagnetic radiation (e.g., IR, visible, UV, etc.) Excitation sources 3008a and 3008b may both be electrically connected to, and controlled by, an excitation source controller 3010. Excitation source controller 3010 may further be coupled to programmable microcontroller 3012. Micro-controller 3012 may serve as a master controller for system 3000a and may generate control signals for the various sub-systems and may communicate data with external systems.

In exemplary embodiments, controller 3012 may be the Raspberry Pi 3 Model B, Raspberry Pi Zero, or Raspberry Pi 1 Model A+. In other embodiments, controller 3012 may be the Mojo Board V3 offered by Embedded Micro—an FPGA (Field Programmable Gate Array) with multiple pre-made shields. In further embodiments, any other suitable controller 3012 may be used.

Electromagnetic radiation generated by excitation sources 3008a and 3008b may be provided to an optical combiner 3014 (e.g. dichroic combiner) by respective optical fiber cables 3016a and 3016b. Electromagnetic radiation provided to optical combiner 3014 (e.g. dichroic combiner) may be provided to optical switch 3018 via optical fiber cable 3016c.

Electromagnetic radiation may be provided to optical output connectors 3200 via various fiber optic cables 3016d, 3016e, 3016f, 3016g, etc. Optical output connectors 3200 may be used to provide optically switchable electromagnetic radiation to a plurality of external sampling chambers (e.g., sample chambers 340f, 340g, 340h, 340i, etc., of FIG. 4A).

In this example, optical output connectors 3200 are shown providing electromagnetic radiation to external systems E1, E2, E3, and E4 through respective fiber optic cables 3017d, 3017e, 3017f, and 3017g. Systems E1, E2, E3, and E4 may be sampling chambers associated with respective fluid sources.

After interacting with fluid samples in one or more external sampling chambers (e.g., of systems E1, E2, E3, and E4), electromagnetic radiation may be received by system 3000a via optical input connectors 3022. Electromagnetic radiation may be received by optical input connectors 3022 via various fiber optic cables 3017h, 3017i, 3017j, 3017k, etc. Electromagnetic radiation received by optical input connectors 3022 may be provided to optical coupler 3024 via various fiber optic cables 3016h, 3016i, 3016j, 3016k, etc. Electromagnetic radiation may be combined by combiner 3024 and then provided to detection system 3026 via fiber optic cable 3016m. Data generated by detection system 3026 may then be provided to controller 3012. As described above, other sensors (e.g., sensors S1, S2, S3, and S4) may be provided to measure other quantities such as viscosity, temperature, particle counts, etc. Information from the various sensors may be gathered by a sensor board 3028, which in turn, may provide such sensor data to controller 3012.

System 3000a may further include a CAN controller 3030 that may communicate with controller 3012 via connector 3031a and may communicate with external systems through CAN connections 3032 through connection 3031b. As described above, CAN controller 3030 may receive data from various external sensors S1, S2, S3, and S4 through respective electrical or optical channels 3044a, 3044b, 3044c, and 3044d, as described below. For example, sensors S1, S2, S3, S4, may be configured to generate data from one or more external systems. For example, sensors S1, S2, S3, and S4 may include temperature and/or viscometers that may make measurements on respective systems E1, E2, E3, E4.

Data generated by detection system 3026 may also be communicated to external systems through CAN connections 3032 through various connections 3044a, 3044b, 3044c, and 3044d. System 3000a may further include a cellular modem 3034 that may communicate through wireless channels with external systems by providing signals to one or more communication devices 3033. In an embodiment, communication device 3033 may be an antenna that generates wireless signals. Cellular modem 3034 may further communicate with and receive control signals from controller 3012 via electrical or optical connection 3035.

System 3000a may further include an external power supply connection 3038 that may be connected to an AC/DC converter 3040 and one or more DC current/voltage supplies 3042a and 3042b. Communication between system 3000a and various other systems may be provided through connections to a wiring harness 3037.

System 3000a may be cooled with one or more cooling systems. For example, system 3000a may include an air intake vent 3034a and an air exhaust vent 3034b. A fan 3036 may further be provided to force air from the air intake vent 3034a to the air exhaust vent 3034b to thereby remove waste heat from enclosure 3006 generated by the various components of system 3000a. Forced air cooling, as provided by vents 3034a and 3034b and fan 3036 (e.g., see FIG. 4B) only removes heat generated by components within system 3000a. As such, forced air cooling may only be used to keep fluid sampling system 3000a at an ambient temperature. In certain circumstances, it may be advantageous to actively cool detection system 3026 or other components to a temperature below ambient temperature.

System 3000a may further be configured to include one or more cooling additional cooling systems 3036 for cooling one or more components of the optical path, as described in great detail below with reference to FIG. 4C. The optical path may be defined to include any component that transmits, routes, receives, and detects electromagnetic radiation as part of system 3000a. For example, components of the optical path may include: optical excitation sources 3008a and 3008b, excitation source controller 3010, controller 3012, optical combiner 3014 (e.g. dichroic combiner), optical switch 3018, optical fiber cables (e.g., optical fiber cables 3016a, 3016b, 3016c, 3016d, 3016e, 3016f, 3016g, 3016h, 3016h, 3016i, and 3016j), optical output connectors 3200, optical input connectors 3022, optical coupler 3024 (e.g. optical coupler 3024 couples the optical signal from similar diameter optical fibers into a larger diameter optical fiber), detection system 3026, sensor board 3028, and one or more sampling chambers (e.g., sample chambers 340f, 340g, 340h, 340i, etc. of FIG. 4A).

With system 3000a of FIG. 4B, fluid sampling systems may be configured to collect optical data from multiple sources without the need for a discrete, isolated optical path. In this example, one or more excitation sources 3008a and 3008b may be combined with a single detection system 3026 to collect optical data from a plurality of fluid sources. Optical excitation sources 3008a and 3008b may be connected to an optical combiner 3014 (e.g. dichroic combiner). Optical combiner 3014 combines (or separate) electromagnetic radiation emitted from multiple excitation sources (e.g., lasers) at a 45° angle of incidence. Optical combiner 3014 may be optimized to multiplex (MUX) any specific wavelength of electromagnetic radiation emitted from excitation sources (e.g., lasers). Optical combiner 3014 combine may also be used to demultiplex (DEMUX) any specific wavelength of electromagnetic radiation emitted from excitation sources (e.g., lasers).

In one embodiment, excitation source 3008a and 3008b may have the same or different excitation properties. For example, excitation source 3008a may include a laser excitation source having a wavelength of 680 nm, while excitation source 3008b may include a laser having a wavelength of 785 nm. In alternative embodiments excitation source 3008a may be an infra-red excitation source while excitation source 3008b may be a laser excitation source having a wavelength of 785 nm. While FIG. 4B shows two excitation sources, additional excitation sources may be employed in alternative embodiments. In further embodiments, an optical combiner 3014 may be unnecessary, and therefore may be excluded.

Optical switch 3018 (e.g., see FIG. 4B) may be configured to cycle through a plurality of fluid sources individually via optical fiber cables (e.g., optical fiber cables 3016d to 3016g, etc.). In an alternative embodiment, optical switch 3018 may be configured to divide the electromagnetic radiation emitted from one or more excitation sources (e.g. 3008a and 3008b), such that a portion of the electromagnetic radiation is directed to each of a plurality of fluid sources via optical fiber cables.

Electromagnetic radiation transmitted from one or more excitation sources (e.g. 3008a and 3008b), may be delivered via optical fiber cables (e.g., optical fiber cables 3016d to 3016g, etc.) to optical probes operationally coupled to a plurality of fluid sources either directly (e.g., using an immersion probe directly in the fluid source) or via a sample chamber.

Detection system 3026 may include a CCD device that may be configured to detect electromagnetic radiation emitted from a fluid source. Data may be collected by the CCD device using a process called binning, which may include line and pixel binning. Binning allows charges from adjacent pixels to be combined and this can offer benefits in faster readout speeds and improved signal to noise ratios albeit at the expense of reduced spatial resolution.

A CCD includes a surface including an array of pixels at defined locations which have the ability to receive electromagnetic radiation and convert such electromagnetic radiation into a digital signal. Electromagnetic radiation interacting with the pixels along a CCD surface produces an electrical charge in each pixel which may be converted into a digital signal that may be transmitted to a computer for analysis using software. Software may be further used to divide a CCD surface into rows of pixels on a horizontal axis and/or a vertical axis. In certain embodiments, an array of pixels may be divided into vertical rows of pixels spanning a CCD surface. In certain embodiments, an array of pixels may be divided into a group of vertical rows of pixels spanning a CCD surface.

The digital signal associated with the electrical charge of each pixel may be collected along each vertical row of pixels along the CCD surface. Digital signals associated with various vertical rows of pixels may also be summed. Summation of the digital signal along one or more vertical rows of a CCD surface allows for amplification of the digital signal. The CCD surface may be organized into multiple regions including one or more vertical rows of pixels. For example, a CCD having 64 vertical rows of pixels may be divided into four regions of 16 vertical rows each or 32 regions of 2 rows each. In an embodiment in which the CCD surface is divided into four (4) regions having 16 vertical rows of pixels, each row may be associated with up to four (4) different fluid sources. In such an embodiment, optical fluid data may be collected from a total of four (4) fluid sources at one time by transmitting electromagnetic radiation received from each fluid source to a corresponding region of the CCD surface.

In further embodiments, a self-contained system may be provided having fewer components than are shown in FIG. 4B. For example, a system may be provided having only an excitation source, a detection source, optical, and electrical connections, configured as a spectrometer. The self-contained spectrometer may be configured to couple directly to a fluid source such as an engine containing oil. The spectrometer may function to generate spectroscopic data while the engine is in operation. The system may further be configured to be electrically coupled to various external analytical systems to provide spectroscopic data to the external analytical systems.

Figure 4C:
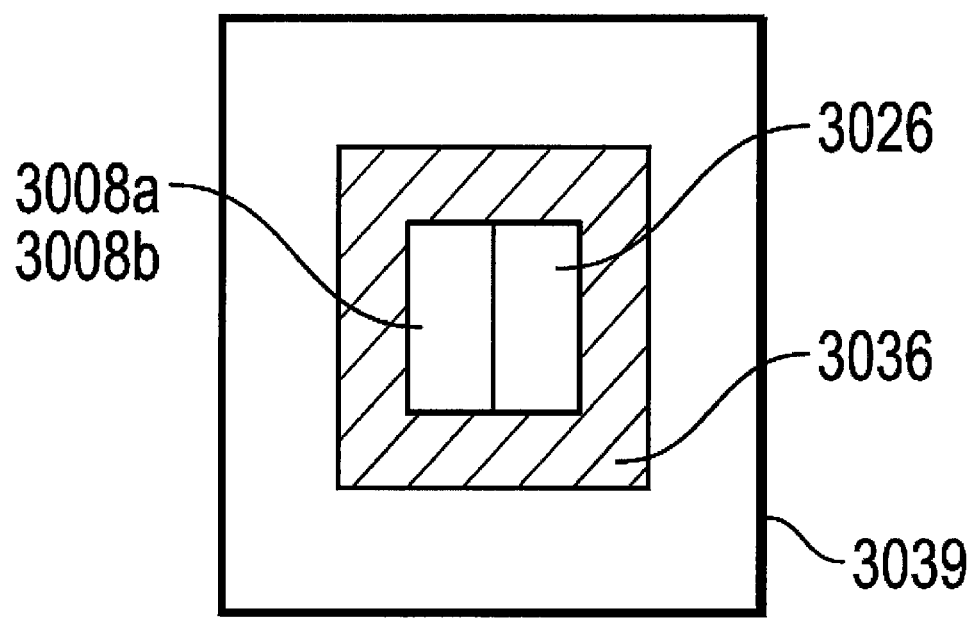
FIG. 4C is a schematic of a cooling system, according to an example embodiment of the disclosure.

FIG. 4C is a schematic of a cooling system 3036, according to an example embodiment of the disclosure. Further details of this and related embodiments are provided in U.S. patent application Ser. No. 15/997,612, filed Jun. 4, 2018, the disclosure of which is incorporated herein by reference in its entirety.

In this example, excitation sources 3008a and 3008b and detection system 3026 are provided with an active cooling system 3036, according to an example embodiment of the disclosure. Cooling of optical path components may reduce optical signal interference or noise associated with detection of optical signals by components subject to elevated thermal exposure. Any component of the optical path may be cooled individually, or any combination of components of the optical path may be cooled, including the entire optical path. In addition to cooling the optical path, embodiments may also be configured to cool one or more power supplies (e.g., 3040, 3042a, and 3042b) of system 3000a (e.g., see FIG. 4B).

Cooling system 3036 may cool detection system 3026 and other components (e.g., excitation sources 3008a and 3008b) to a temperature below ambient temperature. In an embodiment, cooling system 3036 may cool detection system 3026 to a temperature of 100° C. below ambient temperature. In other embodiments, other temperatures may be achieved including 5° C. below ambient, 10° C. below ambient, 20° C. below ambient, etc. In some embodiments, detection system 3026 and cooling system 3036 may be housed in an enclosure 3039.

Cooling system 3036 may include any device (e.g., a refrigeration system) that removes heat from the region to be cooled. For example, cooling of the optical path may be accomplished through the use of thermoelectric cooling, according to an example embodiment of the disclosure. Thermoelectric cooling uses the Peltier effect to create a heat flux between a junction between two different types of materials. A Peltier cooler, heater, or thermoelectric heat pump is a solid-state active heat pump which transfers heat from one side of the device to the other, with consumption of electrical energy, depending on the direction of the current. Additional cooling methods may utilize liquid cooling via fluids to remove heat from components of the optical path. In certain embodiments, components of the optical path may be immersed in fluids such as a non-conductive mineral oil.

In other embodiments, fluids may be pumped through conduits which are operationally coupled to components of the optical path. As the fluids are circulated, heat of the optical path component is transferred to the fluid. The fluid may then be routed through a radiator to remove the heat.

Fluid materials which may be used in liquid cooling systems include: water, mineral oil, liquefied gas, etc.

Figure 4D:
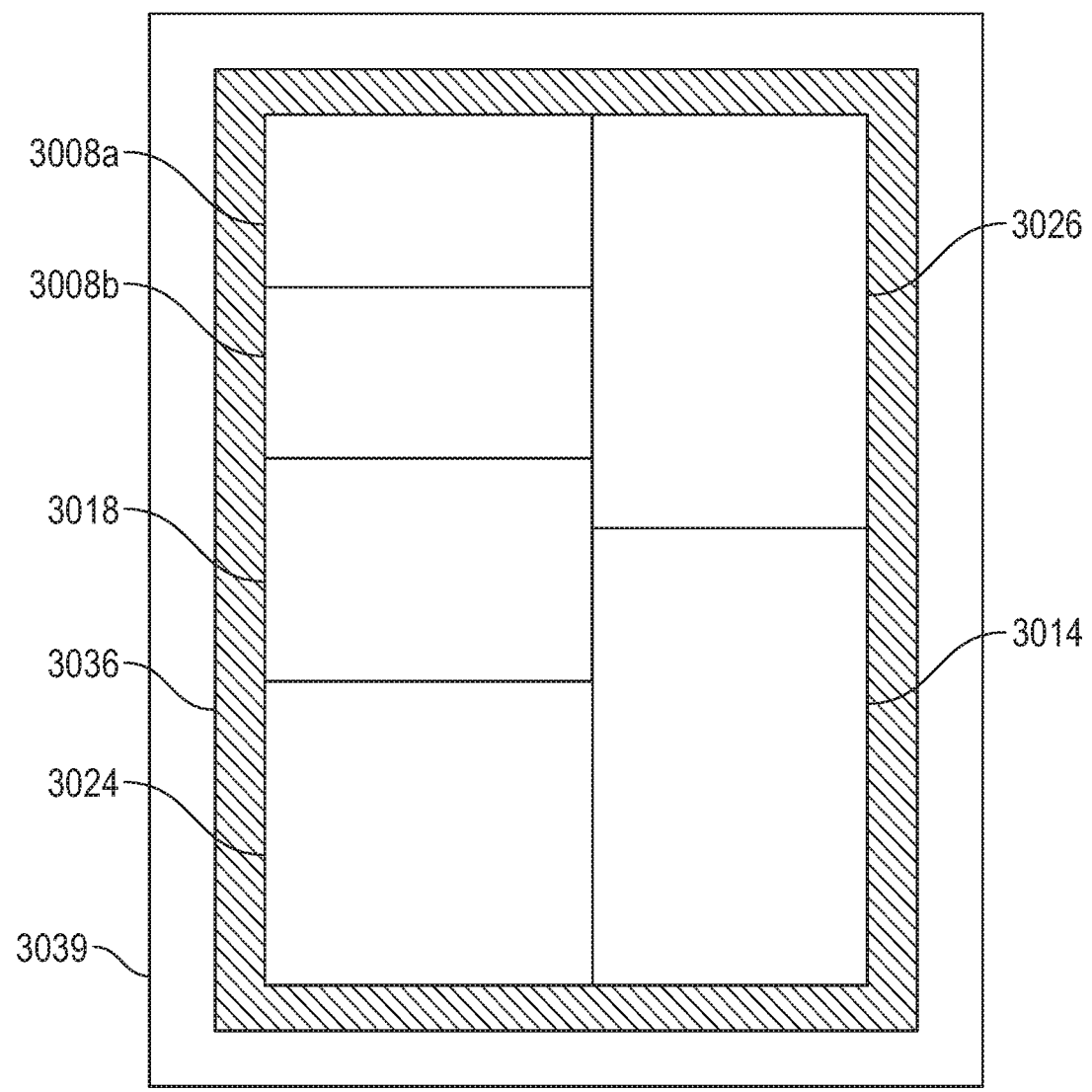
FIG. 4D is a schematic of a cooling system, according to an example embodiment of the disclosure.

FIG. 4D is a schematic of a cooling system 3036, according to an example embodiment of the disclosure. In this embodiment, cooling system 3036 may include various components of fluid sampling system 3000a (e.g., see FIG. 4B). For example, cooling system 3036 may include first 3008a and second 3008b excitation sources, optical switch 3018, optical coupler 3024, and an optical detection system 3026. As described above, detection system 3026 may include a CCD device which may exhibit improved performance at lower temperatures provided by cooling system 3036. In further embodiments, the excitation sources 3008a and 3008b, optical switch 3018, and optical coupler 3024 may also exhibit improved performance with active cooling provided by cooling system 3036. In further embodiment, other configurations of optical components may be provided with active cooling, as described below with reference to FIGS. 4E and 4F.

Figure 4E:
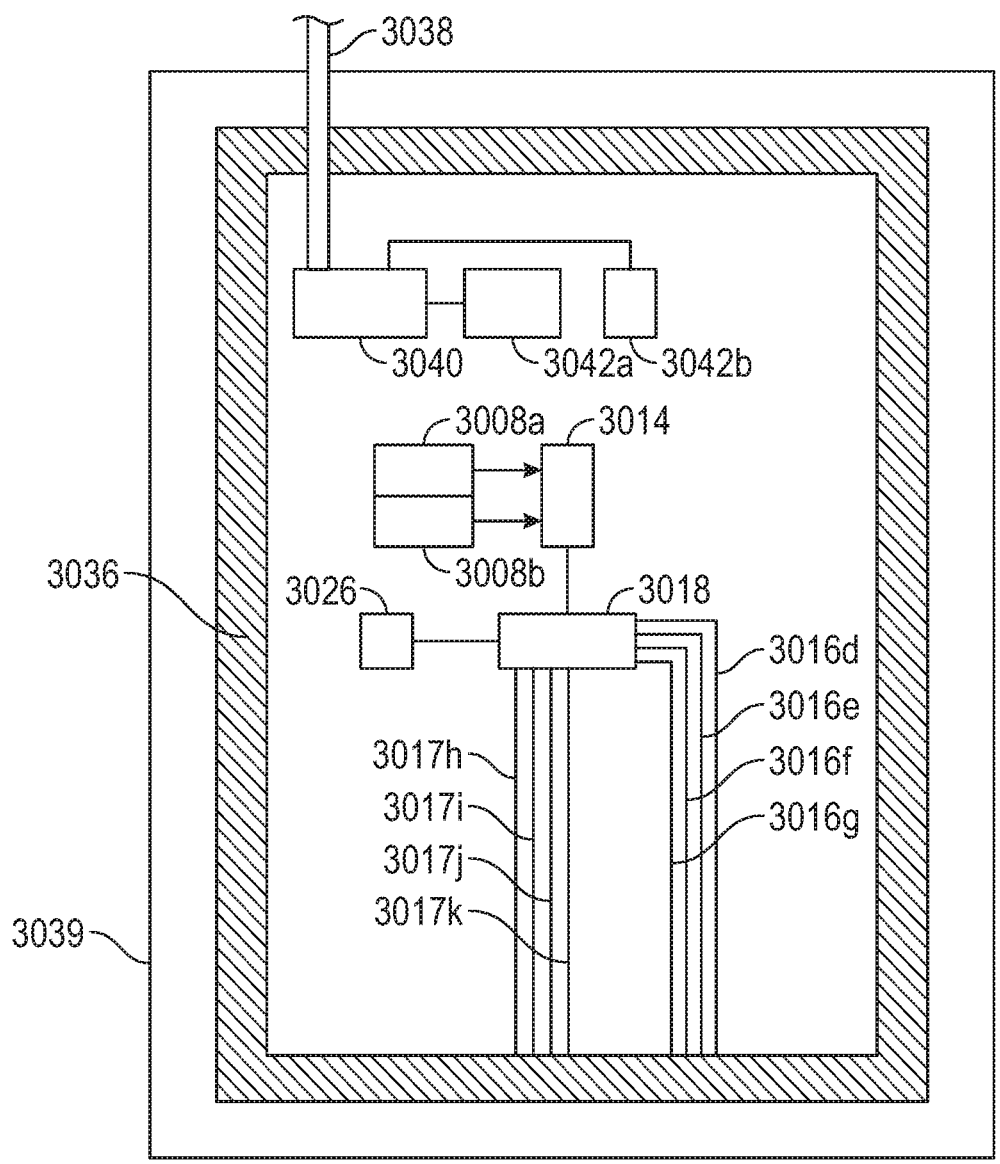
FIG. 4E is a schematic of a cooling system, according to an example embodiment of the disclosure.

FIG. 4E is a schematic of a cooling system 3036, according to an example embodiment of the disclosure. Cooling system 3036 includes a further sub-set of components shown in FIG. 4B. In this example, power supply and conditioning equipment may be actively cooled by cooling system 3036. In this regard, AC/DC converter 3040 and one or more DC current/voltage supplies 3042a and 3042b, may be included in cooling system 3036 to actively remove heat generated by the power supply and conditioning equipment. In this example, first 3008a and second 3008b excitation sources, optical combiner 3014 (e.g. dichroic combiner), detection system 3026, and optical switch 3018, are also provided within the cooling system 3036, as described above with reference to FIG. 4D. In this example, however, optical switch 3018 is shown in a different configuration from that of FIG. 4B.

As shown in FIG. 4E, optical switch 3018 receives combined electromagnetic radiation from optical combiner 3014 and provides such radiation to various fiber optic cables 3016d, 3016e, 3016f, and 3016g. In contrast to the embodiment shown in FIG. 4B, however, optical switch 3018 also receives returning radiation from fiber optic cables 3017h, 3017i, 3017j, and 3017k. Optical switch 3018 is then configured to combine the returning electromagnetic radiation from fiber optic cables 3017h, 3017i, 3017j, and 3017k and to provide the combined electromagnetic radiation to detection system 3026. Thus, in this embodiment, the optical switch 3018 both provides electromagnetic radiation to fiber optic cables 3016d, 3016e, 3016f, and 3016g as output to external systems, and also receives returning electromagnetic radiation from the external systems via fiber optic cables 3017h, 3017i, 3017j, and 3017k. Thus, the single optical switch 3018 of FIG. 4E eliminates the need for the combination of optical switch 3018 and optical coupler 3024 of the embodiment of FIG. 4B.

Figure 4F:
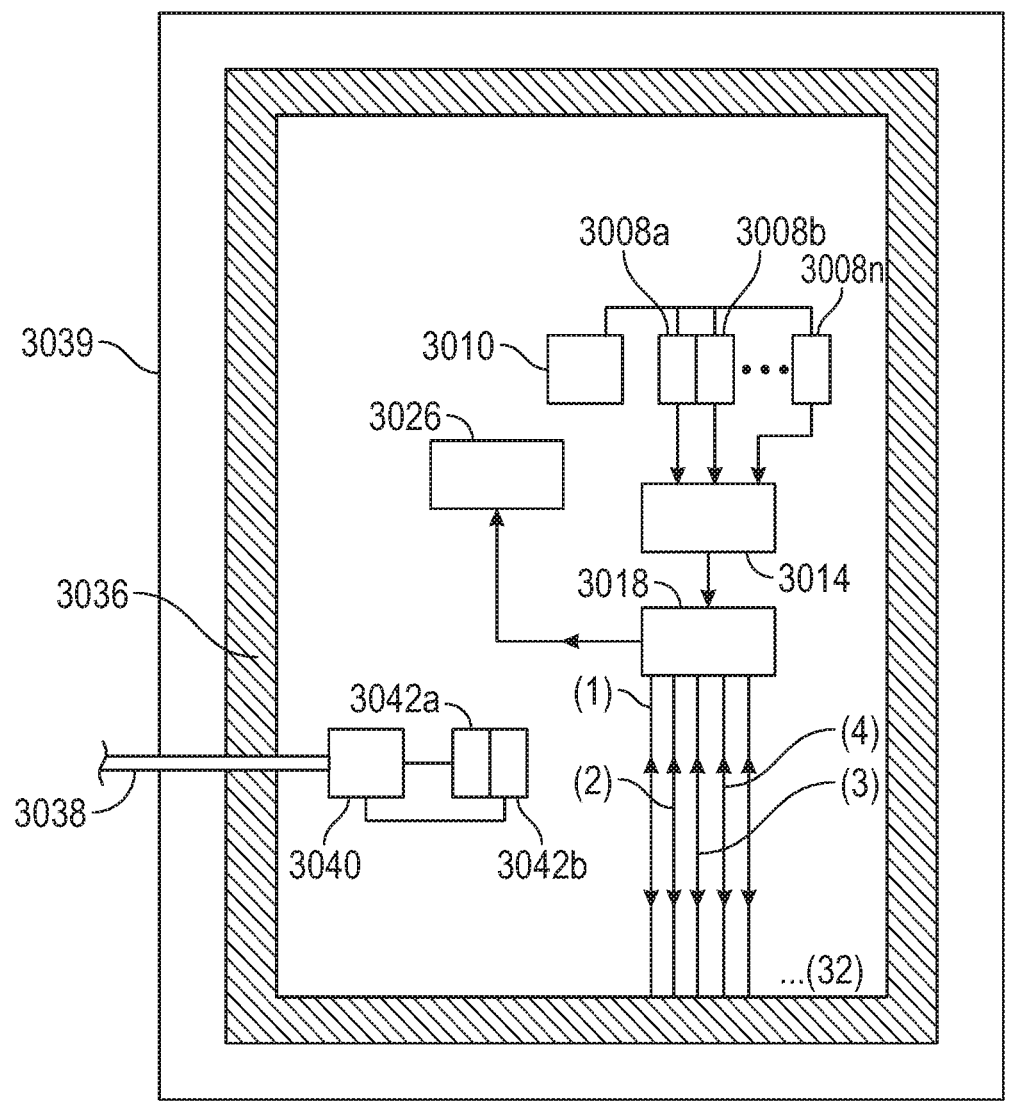
FIG. 4F is a schematic of a cooling system, according to an example embodiment of the disclosure.

FIG. 4F is a schematic of a cooling system 3036, according to an example embodiment of the disclosure. In this embodiment, a plurality of excitation sources 3008a, 3008b, . . . 3008n, are included in cooling system 3036 and may be actively cooled. Each of excitation sources 3008a, 3008b, . . . 3008n may be controlled by an excitation source controller 3010, which is also provided within cooling system 3036. Electromagnetic radiation from the excitation sources 3008a, 3008b, . . . 3008n, may be combined with an optical combiner 3014 (e.g. dichroic combiner), and then provided to an optical switch 3018. In this example, optical switch 3018 may be a 2×32 micro-electromechanical system (MEMS) optical switch. As with other systems mentioned above, optical switch 3018 containing MEMS components may exhibit improved performance with reduced temperatures provided by cooling system 3036.

Optical switch 3018 may be configured to have a single input and 32 switchable outputs. Thus, electromagnetic radiation received by optical switch 3018 from optical combiner 3014 may be switchably routed to one or more of 32 optical pathways to provide electromagnetic radiation to one or more of 32 external systems. As with the optical switch 3018 of FIG. 4E, optical switch 3018 may receive return electromagnetic radiation from one or more of the 32 external sources. Optical switch 3018 may then combined the returned electromagnetic radiation and then provide to detection system 3026. As with the embodiments described above with reference to FIG. 4E, cooling system may also provide active cooling to power supply and conditioning equipment. In this regard, AC/DC converter 3040 and one or more DC current/voltage supplies 3042a and 3042b may also be actively cooled by cooling system 3026. In further embodiments, switches having other numbers of inputs and switchable outputs may be provided.

According to an embodiment of the disclosure, a cooling system may be provided with thermo-electric cooling devices (TECs), also known as Peltier cooling devices which use charge differentials to extract heat to thereby cool a system connected to the TEC. A TEC may be mounted to the CCD detector, and another may be mounted to each laser. In addition, the "cooled" optical path or enclosure 3039 (e.g., see FIGS. 4C to 4F) may need to be purged of air and moisture to prevent condensation. For example, an enclosure 3039 may be filled with a dry inert gas (e.g., nitrogen, argon, etc.) to purge air and moisture from the enclosure.

Figure 5:
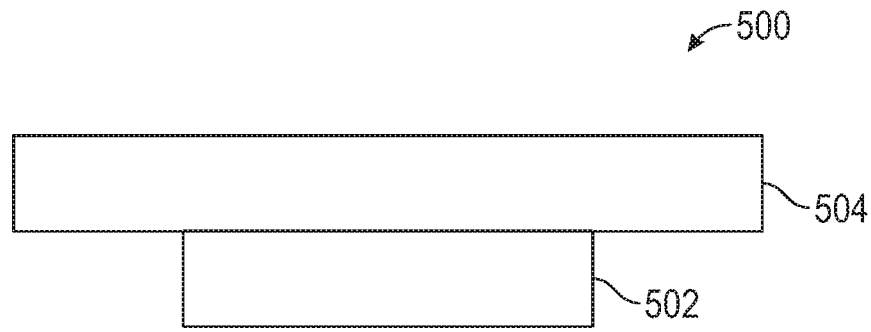
FIG. 5 is a schematic of a cooling system, according to an example embodiment of the disclosure.

FIG. 5 is a schematic of a cooling system 500, according to an example embodiment of the disclosure. In this example, a TEC 502 may be attached a system component 504. In this example, component 504 may be a CCD detector, a laser, an optical switch, an optical coupler, etc. In further embodiments, TEC devices may be provided within or on exterior surfaces of various enclosures 3039.

Various modifications may be made to the disclosed embodiments without departing from the scope or spirit of this disclosure. In addition or in the alternative, other embodiments may be apparent from consideration of the specification and annexed drawings. Disclosed examples provided in the specification and annexed drawings are illustrative and not limiting. Although specific terms are employed herein, they are used in a generic and descriptive sense only and not for purposes of limitation.

What is claimed is:
1. A fluid analysis system, comprising:
  an excitation source configured to generate incident electromagnetic radiation;
  a detection system configured to detect scattered/emitted electromagnetic radiation to generate Raman spectral data;
  a fluid inlet configured to mechanically couple to a fluid source and to receive a fluid sample from the fluid source;
  a sample chamber fluidically coupled to the fluid inlet and configured to receive the fluid sample from the fluid source;
  a Raman probe optically coupled to the sample chamber, to the excitation source, and to the detection system, the probe configured:

to receive the incident electromagnetic radiation from excitation source and to deliver the incident radiation to the fluid sample; and to receive scattered/emitted radiation from the fluid sample and to deliver the scattered/emitted radiation to the detection system; and a cooling system including an enclosure that encloses the excitation source and the detection system, wherein the cooling system is configured to maintain a temperature within the enclosure at or below ambient temperature.

2. The fluid analysis system of claim 1, wherein the enclosure of the cooling system also encloses at least one of the fluid inlet, the sample chamber, and/or the Raman probe.

3. The fluid analysis system of claim 1, wherein the cooling system is configured to maintain a temperature within the enclosure below ambient temperature.

4. The fluid analysis system of claim 3, wherein the cooling system is configured to maintain a temperature within the enclosure between about 1 degree C. below ambient temperature to about 100 degrees C. below ambient temperature.

5. The fluid analysis system of claim 1, further comprising an optical switch and an optical coupler, wherein the enclosure of the cooling system also encloses the optical switch and the optical couple.

6. The fluid analysis system of claim 5, wherein the detection system includes a CCD device.

7. The fluid analysis system of claim 5, further comprising an optical combiner, wherein the enclosure of the cooling system also encloses the optical combiner.

8. The fluid analysis system of claim 1, further comprising a power supply and conditioning equipment including at least one AC/DC converter and one or more DC current/voltage supplies, wherein the enclosure of the cooling system also encloses the power supply and the conditioning equipment.

9. The fluid analysis system of claim 1, further comprising an optical switch that selectively provides electromagnetic radiation to, and selectively receives electromagnetic radiation from, a plurality of external systems, wherein the enclosure of the cooling system also encloses the optical switch.

10. The fluid analysis system of claim 1, further comprising a 2×32 MEMS based optical switch, wherein the enclosure of the cooling system encloses the optical switch.

11. The fluid analysis system of claim 1, wherein the cooling system is configured to maintain a temperature within the enclosure at least 20 degrees C. below ambient temperature.

12. The fluid analysis system of claim 11, further comprising an optical switch, wherein the enclosure of the cooling system also encloses the optical switch.

13. A fluid analysis system, comprising:

an excitation source configured to generate incident electromagnetic radiation;

a detection system configured to detect scattered/emitted electromagnetic radiation to generate spectral data;

a fluid inlet configured to mechanically couple to a fluid source and to receive a fluid sample from the fluid source;

a sample chamber fluidically coupled to the fluid inlet and configured to receive the fluid sample from the fluid source;

an optical probe optically coupled to the sample chamber, to the excitation source, and to the detection system, the probe configured:

to receive the incident electromagnetic radiation from excitation source and to deliver the incident radiation to the fluid sample; and to receive scattered/emitted radiation from the fluid sample and to deliver the scattered/emitted radiation to the detection system; and a cooling system including an enclosure that encloses the excitation source and the detection system, wherein the cooling system is configured to maintain a temperature within the enclosure at or below ambient temperature.

14. The fluid analysis system of claim 13, wherein the enclosure of the cooling system also encloses at least one of the fluid inlet, the sample chamber and/or the optical probe.

15. The fluid analysis system of claim 13, wherein the cooling system is configured to maintain a temperature within the enclosure below ambient temperature.

16. The fluid analysis system of claim 15, wherein the cooling system is configured to maintain a temperature within the enclosure between about 1 degree C. below ambient temperature to about 100 degrees C. below ambient temperature.

17. The fluid analysis system of claim 13, further comprising an optical switch and an optical coupler, wherein the enclosure of the cooling system also encloses the optical switch and the optical coupler.

18. The fluid analysis system of claim 17, further comprising an optical combiner, wherein the enclosure of the cooling system also encloses the optical combiner.

19. The fluid analysis system of claim 13, wherein the cooling system is configured to maintain a temperature within the enclosure at least 20 degrees C. below ambient temperature.

20. The fluid analysis system of claim 19, further comprising an optical switch, wherein the enclosure of the cooling system also encloses the optical switch.

* * * * *